(12) United States Patent
Maeda (10) Patent No.: US 10,481,473 B2
(45) Date of Patent: Nov. 19, 2019

(54) IMAGE PROJECTION APPARATUS (71) Applicant: CANON KABUSHIKI KAISHA, Tokyo (JP)

(72) Inventor: Yuuki Maeda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/059,507

(22) Filed: Aug. 9, 2018

(65) Prior Publication Data

US 2019/0049832 A1 Feb. 14, 2019

(30) Foreign Application Priority Data

Aug. 10, 2017 (JP) .................... 2017-154902

(51) Int. Cl.
*G03B 21/28* (2006.01)
*G03B 21/20* (2006.01)
(Continued)

(52) U.S. Cl.
CPC ......... *G03B 21/2033* (2013.01); *G02B 13/16* (2013.01); *G03B 21/005* (2013.01); *G03B 21/006* (2013.01); *G03B 21/008* (2013.01); *G03B 21/2073* (2013.01); *G03B 21/28* (2013.01); *H04N 9/3126* (2013.01); *G02B 27/1026* (2013.01); *G02B 27/141* (2013.01);
(Continued)

(58) Field of Classification Search
CPC .. G03B 21/006; G03B 21/008; G03B 21/028; G03B 21/2013; G03B 21/2033; G03B 21/2066; H04N 9/315; H04N 9/31105; H04N 9/3114; H04N 9/3117; H04N 9/3126; H04N 9/3164
See application file for complete search history.

(56) References Cited

U.S. PATENT DOCUMENTS 7,445,345 B2 11/2008 Itoh et al.
2005/0185139 A1* 8/2005 Yamanaka ........... G02B 27/283
353/20
(Continued)

FOREIGN PATENT DOCUMENTS

JP 2007114686 A 5/2007
JP 2007121693 A 5/2007
(Continued)

OTHER PUBLICATIONS

Combined Search and Examination Report issued in GB Appln. No. 1812684.7 dated Feb. 4, 2019.

*Primary Examiner* — Sultan Chowdhury
(74) *Attorney, Agent, or Firm* — Rossi, Kimms & McDowell LLP (57) ABSTRACT

An image projection apparatus includes a first light modulation element configured to modulate first light from a light source and to generate second light, a second light modulation element configured to modulate second light, an imaging optical system configured to image the second light on the second light modulation element and disposed on an optical path from the first light modulation element to the second light modulation element. The image projection apparatus is configured to project an image formed by light from the second light modulation element onto a projection surface and satisfies a predetermined condition.

14 Claims, 7 Drawing Sheets

(51) Int. Cl.
  *G02B 13/16* (2006.01)
  *G03B 21/00* (2006.01)
  *H04N 9/31* (2006.01)
  *G02B 27/10* (2006.01)
  *G02B 27/14* (2006.01)
  *G02B 27/28* (2006.01)
(52) U.S. Cl.
  CPC .......... *G02B 27/149* (2013.01); *G02B 27/283* (2013.01); *G03B 21/2066* (2013.01)

(56) References Cited

U.S. PATENT DOCUMENTS

| | | | | |
|---|---|---|---|---|
| 2007/0201006 | A1* | 8/2007 | Amano | G02B 27/0068 353/31 |
| 2007/0229718 | A1* | 10/2007 | Hall, Jr. | H04N 5/7416 348/744 |
| 2009/0009720 | A1* | 1/2009 | Chen | G02B 27/283 353/20 |
| 2013/0077056 | A1* | 3/2013 | Okuda | H04N 9/3105 353/31 |

FOREIGN PATENT DOCUMENTS

| | | |
|---|---|---|
| JP | 4158757 B2 | 10/2008 |
| WO | 2005115012 A1 | 12/2005 |

\* cited by examiner

IMAGE PROJECTION APPARATUS

BACKGROUND OF THE INVENTION

Field of the Invention

The present invention relates to an image projection apparatus (projector).

Description of the Related Art

For a high-contrast projector, Japanese Patent No. 4,158, 757 discloses a projector that: combines together a plurality of color light fluxes (i.e. light beams of different color) from a plurality of light modulation elements (image modulation elements); directs the combined light onto another light modulation element (luminance modulation element) to form an image thereon via an imaging optical system; and projects the image light (i.e. light from the image) modulated by the luminance modulation element onto a projection surface via a projection lens. A projector disclosed in Japanese Patent Laid-Open No. 2007-121693 modulates light from a light source through a luminance modulation element, chromatically separates luminance modulated light from the luminance modulation element, and forms an image on a plurality of image modulation elements through an imaging optical system. Then, the plurality of color light fluxes (light beams of different color) from the plurality of image modulation elements are combined together and projected as image light onto a projection surface via a projection lens.

However, the projector disclosed in Japanese Patent No. 4,158,757 needs an imaging optical system with an extremely high imaging performance so as to (i) maintain the resolution performance of the image light from the image modulation elements and (ii) modulate the luminance through the luminance modulation elements. On the other hand, in the projector disclosed in Japanese Patent Laid-Open No. 2007-121693, since the light with a higher intensity from the light source enters the luminance modulation element than that of each separated color light entering the image modulation element, the life of the luminance modulation element may be shorter than that of the image modulation element.

SUMMARY OF THE INVENTION

The present invention provides a high-contrast image projection apparatus that has a high durability and a simple structure.

An image projection apparatus according to one aspect of the present invention includes a first light modulation element configured to modulate first light from a light source and to generate second light, a second light modulation element configured to modulate second light, an imaging optical system configured to image the second light on the second light modulation element and disposed on an optical path from the first light modulation element to the second light modulation element. The image projection apparatus is configured to project an image formed by light from the second light modulation element onto a projection surface. The imaging optical system satisfies $\beta \leq 0.95$ where $\beta$ is an imaging magnification of the imaging optical system.

Further features, advantages and aspects of the present invention will become apparent from the following description of exemplary embodiments with reference to the attached drawings. It should be understood that any of the features described herein in relation to a particular embodiment or set of embodiments may be combined with the features of one or more other embodiments without any limitations other than those imparted by the broadest aspects of the invention as defined hereinabove. In particular, features from different embodiments can be combined where necessary or where the combination of elements or features from individual embodiments in a single embodiment is beneficial.

DESCRIPTION OF THE EMBODIMENTS

Referring now to the accompanying drawings, a description will be given of embodiments according to the present invention.

First Embodiment

Figure 1:
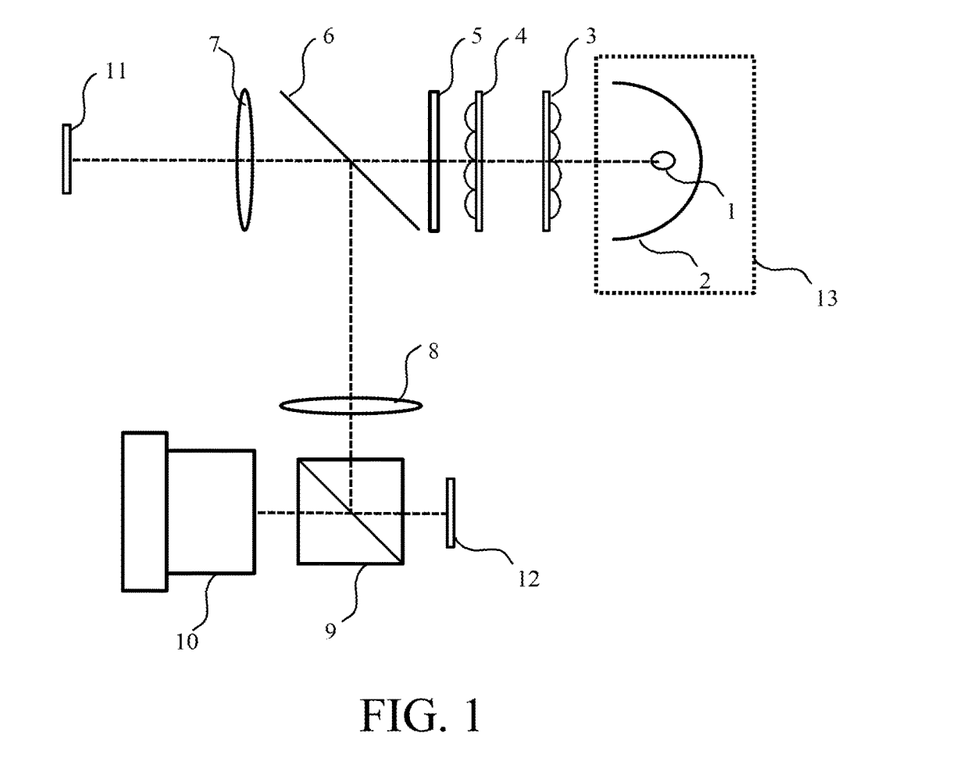
FIG. 1 is a sectional view illustrating a structure of an optical system in a projector according to a first embodiment of the present invention.

FIG. 1 illustrates an entire optical system in a projector as an image projection apparatus according to a first embodiment according to the present invention. The projector displays a projected image based on an input image signal supplied from an image supplying apparatus, such as an unillustrated personal computer. The optical system includes an illumination optical system for illuminating a first light modulation element 11 with illumination light (first light) from a light source unit 13. The first light modulation element 11 modulates the luminance of the illumination light (first light) to provide luminance modulates light (second light). The optical system also includes an imaging optical system. The imaging optical system images the luminance modulated light (second light) onto a second light modulation element 12—i.e. the imaging optical system directs the second light onto a second light modulation element 12. This embodiment preferably uses a reflection type liquid crystal panel for each of the first and second light modulation elements 11 and 12.

The light source unit 13 includes a light source 1 (such as an ultrahigh pressure mercury lamp or a Xenon lamp) and a reflector 2 for reflecting light from the light source 1. The light source unit 13 may alternatively use a LED or a laser as the light source 1. Alternatively, this embodiment may use a light source unit having a fluorescent body which may be excited by a laser beam to emit fluorescent light.

The illumination optical system includes a first fly-eye lens 3, a second fly-eye lens 4, a polarization conversion element 5, a first polarization beam splitter ("PBS") 6, and preferably the imaging optical system. The imaging optical system images/directs the luminance modulated light (first light) from the first light modulation element 11 onto the second light modulation element 12, and includes a first lens system 7 and a second lens system 8.

The illumination light from the light source unit 13 is divided into a plurality of light fluxes (e.g. light beams) by the first fly-eye lens 3, and each light flux is condensed (i.e. the first fly-eye lens 3 focuses/condenses the light fluxes). The plurality of light fluxes from the first fly-eye lens 3 pass through the second fly-eye lens 4, and form a plurality of light source images (e.g. separate sources of light for illumination). Each light source image may provide a non-polarized light source flux (i.e. non-polarized light beam for illumination). The polarization conversion element 5 is located near a position at which the light source image is formed.

The polarization conversion element 5 converts each non-polarized light source flux from the second fly-eye lens 4 into polarized light (e.g. P-polarized light herein) having a specific polarization direction. Polarized light (P-polarized light) from the polarization conversion element 5 then enters (i.e. falls incident upon) the first PBS 6. The PBS 6 either transmits or reflects polarized light depending on the direction of polarization. P-polarized light which is transmitted by the first PBS 6 is condensed (focused) by the first lens system 7 and directed onto the first light modulation element 11. The first light modulation element 11 is driven based on the above input image signal so as to modulate illumination light (first light) according to the input image signal. Preferably, the first light modulation element 11 is a reflection-type light modulator. Thus, P-polarized light from the first lens system may be modulated and preferably reflected by the first light modulation element 11 to form luminance modulated light (e.g. S-polarized light).

The luminance modulated light (e.g. S-polarized light) emitted from the first light modulation element 11 is condensed by the first lens system 7, reflected by the first PBS 6, condensed by the second lens system 8, reflected by a second PBS 9, and imaged onto the second light modulation element 12. The light (e.g. P-polarized light) that is not luminance-modulated by the first light modulation element 11 transmits through the first PBS 6 and returns to the light source unit side.

The second light modulation element 12 is driven based on the above input image signal so as to modulate the luminance modulated light (e.g. S-polarized) light according to the input image. The second light modulation element 12 may be a reflection-type light modulator arranged to reflect luminance modulated light. The light which has been modulated by the second light modulation element 12 may be referred to herein as image light. The image light (e.g. P-polarized light) emitted from the second light modulation element 12 is transmitted through the second PBS 9, and is projected on a projection surface, such as a screen (unillustrated) by a projection lens 10. The light (e.g. S-polarized light) that is not modulated by the second light modulation element 12 is reflected by the second PBS 9 and returns to the light source unit side.

In the projector according to this embodiment, the first light modulation element 11 controls the luminance level of the incident light (luminance modulated light) for each image area in the second light modulation element 12, and the second light modulation element 12 controls the luminance level of the emitted light (image light) for each pixel. This two-stage control of the light luminance level can advantageously provide a high contrast and multiple gradations. For example, assume that the contrast realized by the first PBS 6 and the first light modulation element 11 is 200:1, and the contrast ratio realized by the second PBS 9 and the second light modulation element 12 is 5000:1. Then, the projector can realize the contrast of 1000000:1.

The first light modulation element 11, which receives illumination light from the light source unit 13, preferably has a reflectance of about 60% to 80%. Thus, the energy of the illumination light incident on the first light modulation element 11 is higher than that of the luminance modulated light incident on the second light modulation element 12. When the first light modulation element 11 and the second light modulation element 12 have the same panel sizes (areas of light incident regions), the life (i.e. operational lifetime) of the first light modulation element 11 is shorter than that of the second light modulation element 12 because the intensity of light incident on the first light modulation element 11 is higher than that incident on the second light modulation element 12. In general, the life of light modulation elements such as liquid crystal panels shorten as the light density becomes higher. It is thus necessary to increase the panel size and to reduce the light density on the first light modulation element 11, in order to improve the life of the first light modulation element 11.

According to this embodiment, the first lens system 7 and the second lens system 8 of the imaging optical system each constitute a telecentric optical system on both sides of the first light modulation element side and the second light modulation element side. This embodiment preferably satisfies a condition of:

$$\beta \leq 0.95 \qquad (1)$$

where $\beta$ is an imaging magnification of the imaging optical system.

The condition of the expression (1) means that the first light modulation element 11 has a demagnifying effect such that the size of the image formed by the luminance modulated light is reduced and projected onto the second light modulation element 12. In other words, the area of the region in the first light modulation element 11 which the illumination light enters is made larger than that in the second light modulation element 12 which the luminance modulated light enters—i.e. the area of the first light modulation element 11 which receives illumination light is made larger that the area of the second light modulation element 12 which receives luminance modulated light. Hence, in the imaging optical system of this embodiment, the panel size of the first light modulation element 11 may be made larger than that of the second light modulation element 12 so as to satisfy the condition of the expression (1). In this way, the light intensity incident on the first light modulation element 11 can be reduced in proportion to the square of $\beta$, and consequently the life of the first light modulation element 11 can be improved. That is, the durability of the projector can be advantageously improved. When the imaging magnification $\beta$ exceeds the upper limit value in the expression (1), it will be appreciated that the density of incident light on the first light modulation element 11 cannot be significantly reduced, and thus the life improving effect cannot be obtained. In comparison to systems which increase the size of both the first and the second light modulation elements 11, 12 in order to reduce the density of light, it will be appreciated that the projector of this embodiment can advantageously be made more compact.

In alternative systems, the following condition may be satisfied:

$$\beta \leq 0.85 \quad (2)$$

Figure 2:
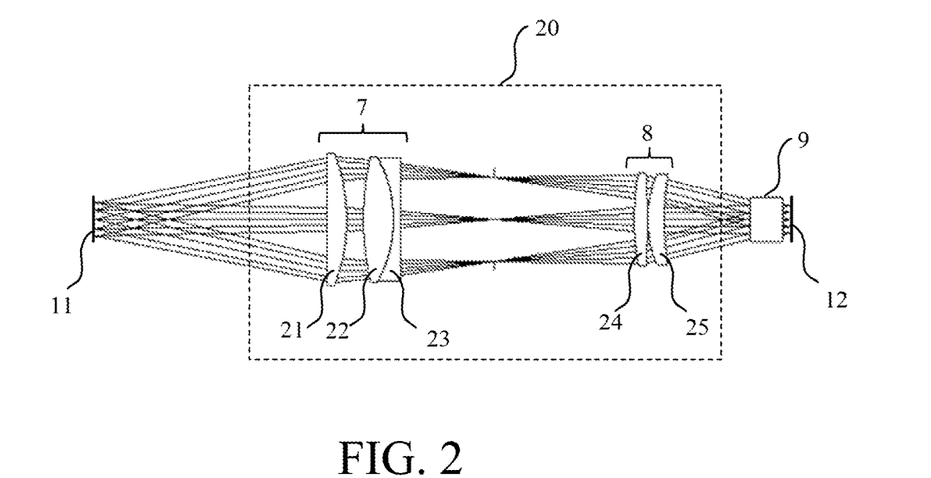
FIG. 2 is a sectional view illustrating a structure of an imaging optical system according to the first embodiment.

FIG. 2 illustrates a structure of the imaging optical system 20 (7, 8). In the first lens system 7, a first lens 21 is a positive lens, a second lens 22 is a positive lens, and a third lens 23 is a negative lens. In the second lens system 8, a fourth lens 24 is a positive lens, and a fifth lens 25 is a positive lens. The second lens 22 and the third lens 23 constitute a cemented lens. In FIG. 2, each of the first lens system 7 and the second lens system 8 has a plurality of lenses but at least one of the two lens systems may have a single lens.

TABLE 1 summarizes a first numeral example (i.e. numerical example 1) of the imaging optical system. In the numerical example, i represents an order of optical surfaces starting from the first modulation element side (front side), and r is a radius of curvature (mm) of the i-th optical surface (i-th surface). In addition d is a distance (separation) (mm) between the i-th and (i+1)-th surfaces, nd and vd are a refractive index and an Abbe number of a material in the i-th optical element based on the d-line, f is a focal length (mm), and Fno is an F number.

TABLE 1

<NUMERICAL EXAMPLE 1>
f = 230.8 (mm)
Fno = 2.1
β = 0.84

| i | r | d | nd | vd | NOTES |
|---|---|---|---|---|---|
| 1 | 0 | 139.0 | | | first light modulation element |
| 2 | 0 | 12.0 | 1.780 | 40.1 | first lens |
| 3 | 108.81 | 10.0 | | | |
| 4 | −161.94 | 18.0 | 1.673 | 56.3 | second lens |
| 5 | 74.94 | 4.0 | 1.801 | 25.6 | third lens |
| 6 | −1220.05 | 57.0 | | | |
| 7 | 0 | 84.0 | | | diaphragm (aperture stop) |
| 8 | −143.44 | 8.0 | 1.532 | 63.0 | fourth lens |
| 9 | 776.53 | 0.1 | | | |
| 10 | −68.96 | 10.0 | 1.581 | 60.1 | fifth lens |
| 11 | −162.53 | 51.1 | | | |
| 13 | 0 | 19.5 | 1.805 | 25.4 | second PBS |
| 14 | 0 | 4.3 | | | |
| 15 | 0 | 0.0 | | | second light modulation element |

The numerical example 1 uses a 1.0-inch reflection type liquid crystal panel for the first light modulation element 11. In this first light modulation element 11, the modulable pixel area that can modulate incident light has a size of 20.48 mm×15.36 mm. The second light modulation element 12 uses a 0.71-inch reflection type liquid crystal panel. In this second light modulation element 12, the modulable pixel area that can modulate incident light has a size of 15.36 mm×9.6 mm. The first light modulation element 11 has a resolution of XGA (1024×768 pixels) with a pixel width of 0.02 mm. The second light modulation element 12 has a resolution of WUXGA (1920×1200 pixels) with a pixel width of 0.008 mm.

The imaging optical system 20 has an imaging magnification β of 0.84. Hence, in the second light modulation element 12, when the effective pixel area (15.36 mm×9.6 mm equal to the modulable pixel area) for actually modulating the luminance modulated light is reversely projected on the light moduable area in the first light modulation element 11, the image has a size of 18.28 mm×11.42 mm. The area in which the reversely projected image is formed corresponds to the effective pixel area for actually modulating the illumination light inside the modulable pixel area (20.48 mm×15.36 mm) in the first light modulation element 11 and has 914×571 pixels.

The luminance modulated light is generated in which the luminance level is controlled for each pixel in the first light modulation element 11 by driving the pixels in the effective pixel area in the first light modulation element 11 and by modulating the illumination light (or by performing the light modulation). Since the resolution (number of pixels) is different as descried above, the luminance modulated light having the controlled luminance level for each pixel area that contains a plurality of pixels enters the effective pixel area in the second light modulation element 12. No light modulation is performed for the pixel area outside the effective pixel area, in the modulable pixel area in the first light modulation element 11.

Hence, the effective pixel area in the first light modulation element 11 is made narrower than the modulable pixel area. Thereby the first light modulation element 11 can advantageously use a light modulation element with a size and aspect ratio different from those of the second light modulation element 12.

Figure 9:
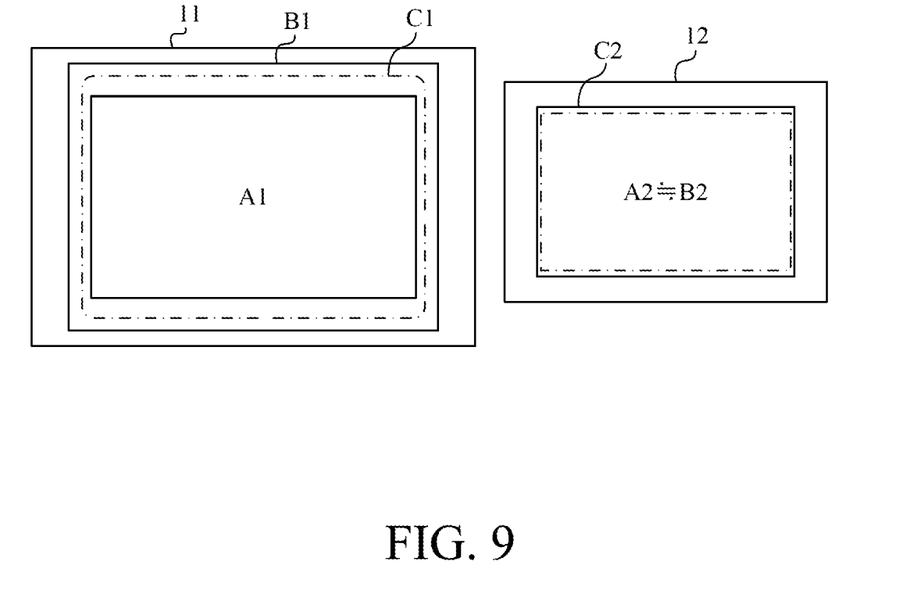
FIG. 9 illustrates a first light modulation element and a second light modulation element according to the first embodiment.

FIG. 9 schematically illustrates a size relationship between the first light modulation element 11 and the second light modulation element 12, and a relationship between a modulable pixel area and an effective pixel area. On the left side in FIG. 9, B1 denotes the modulable pixel area in the first light modulation element 11, and A1 denotes the effective pixel area inside the modulable pixel area B1. An area C1 illustrated by an alternate long and short dash line denotes a light incident area in the modulable pixel area B1 over which the illumination light enters (i.e. over which the illumination light is incident). The light incident area C1 is set wider than the effective pixel area A1 to some extent. On the right side in FIG. 9, B2 denotes the modulable pixel area in the second light modulation element 12, and A2 denotes an effective pixel area set as large as or slightly narrower than the modulable pixel area B2. In the second light modulation element 12, the luminance modulated light from the first light modulation element 11 enters a light incident area C2 as large as or slightly narrower than the effective pixel area A2.

Due to the manufacturing accuracies and arrangement accuracies in the lens and other optical elements in the imaging optical system 20, the luminance modulated light from the effective pixel area A1 in the first light modulation element 11 may shift from and enter the effective pixel area A2 in the second light modulation element 12. Then, the shift can be corrected by moving (or changing) the effective pixel area A1 in the first light modulation element 11 in the light incident area C1 widely set in the modulable pixel area B1. As a result, it is unnecessary to maintain the manufacturing accuracies and arrangement accuracies in the lens and other optical elements in the imaging optical system 20, and a high contrast can be realized with a simple electric control.

The effective pixel area A1 in the first light modulation element 11 may be similar to the effective pixel area A2 in the second light modulation element 12. The similarity may fall within a permissible range as well as being completely similar. Assume that the effective pixel area A1 in the first light modulation element 11 has a long side of x1 and a short side of y1 and the effective pixel area A2 in the second light modulation element 12 has a long side of x2 and a short side of y2. Then, the complete similarity is met when y1/x1=y2/x2 is satisfied. The permissible similarity is met when $0.8 \leq (y1/x1)/(y2/x2) \leq 1.2$ is satisfied. Thus, the effective pixel area A1 in the first light modulation element 11 and the effective pixel area A2 in the second light modulation element 12 may not be similar to each other.

An electric circuit substrate for driving the first light modulation element 11 can be made smaller by using a liquid crystal panel for the first light modulation element 11 which has a resolution lower than that of the second light modulation element 12 as in this embodiment. In addition, the black matrix in the first light modulation element 11 can be made less conspicuous. Due to the need to strike a balance between the projected image quality and miniaturization, the resolution of the first light modulation element 11 may satisfy the following condition.

$$bx/10 \leq ax \leq bx/1.1$$

$$by/10 \leq ay \leq by/1.1 \qquad (3)$$

In the expression (3), ax represents the number of pixels in the long side direction of the first light modulation element 11, ay represents the number of pixels in the short side direction of the first light modulation element 11, bx represents the number of pixels in the long side direction of the second light modulation element 12, and by represents the number of pixels in the short side direction of the second light modulation element 12.

Figure 3:
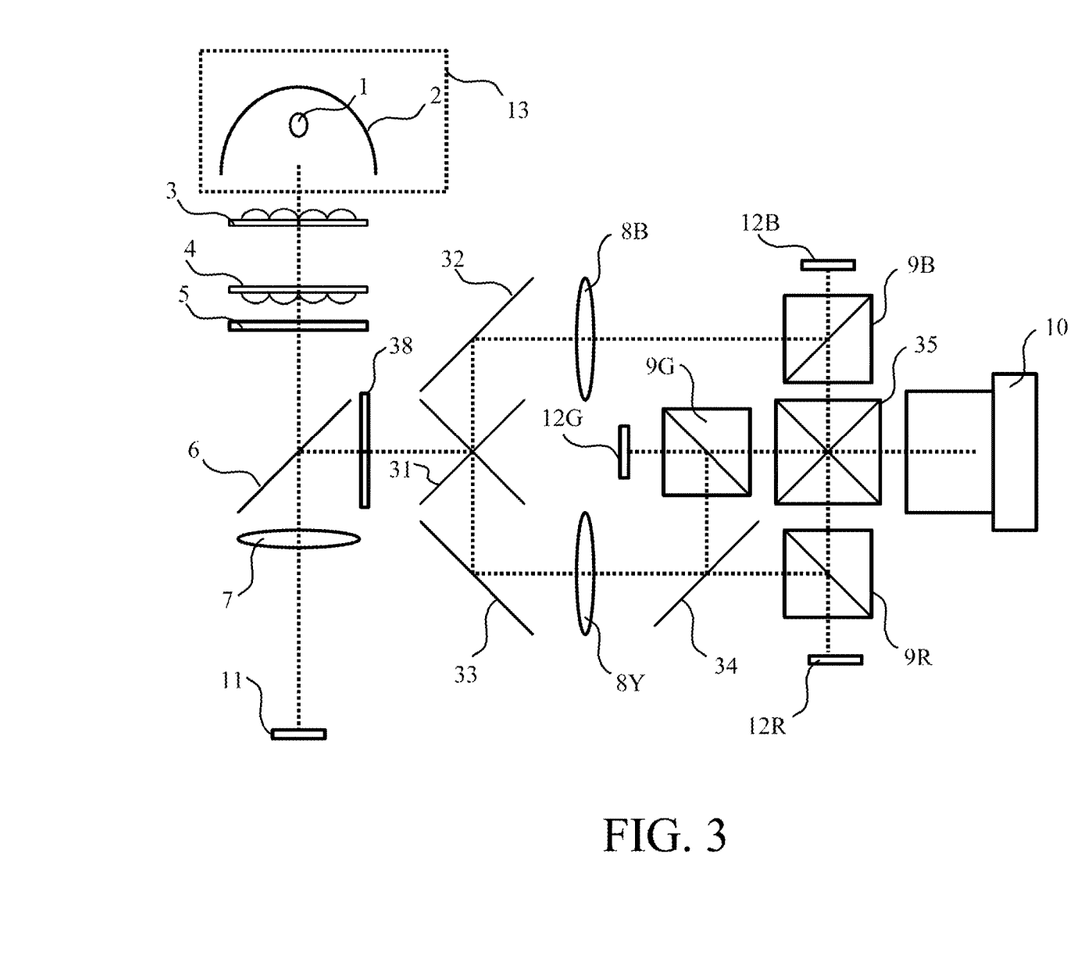
FIG. 3 is a sectional view illustrating a detailed structure of an optical system according to the first embodiment.

While FIG. 1 illustrates the single second light modulation element 12, the actual projector includes three second light modulation elements 12 corresponding to R (red), G (green), and B (blue) colors. The second PBS 9 serves as a color separation and combination optical system that (i) generates R light, G light, and B light as luminance modulated light fluxes, (ii) directs these light fluxes to the three second modulation elements 12, and (iii) combines together the R light, the G light, and the B light from these three second light modulation elements 12. It will be appreciated that the light modulated by each of the second light modulation elements 12 may be referred to herein as image light fluxes. FIG. 3 illustrates an illustrative color separation and combination optical system.

In FIG. 3, a cross dichroic mirror (color separation element) 31 separates the luminance modulated light (S-polarized light) reflected by the first PBS 6 into first color light (B light) and second color light (Y light=G light+R light). A polarization plate 38 is located between the first PBS 6 (or the first light modulation element 11) and the cross dichroic mirror 31, and transmits the S-polarized light (and does not transmit the P-polarized light). This polarization plate 38 may use an absorption type polarization plate that absorbs the P-polarized light or a reflection type polarization plate that reflects the P-polarized light, but the absorption type polarization plate can advantageously prevent the ghost caused by the reflection of the P-polarized light.

The first color light is reflected by a first mirror 32, and enters a second light modulation element 12B (for modulating the B light) via a second lens system 8B and a second PBS 9B for the B light. The first color light (P-polarized light) is modulated and reflected by the second light modulation element 12B to form image light. The image light from the second light modulation element 12B transmits through the second PBS 9B, and is then reflected by a cross dichroic prism 35, before being projected onto a screen (not illustrated) by the projection lens 10.

The second color light (Y light) transmits through a second lens system 8Y and onto a dichroic mirror 34. The dichroic mirror 34 separates the second color light (Y light) into third color light (G light) and fourth color light (R light). The third color light (G light) enters a second light modulation element 12G for the G light via a second PBS 9G for the G light. The second light modulation element 12G modulates and reflects the third color light (P-polarized light) to provide image light. The image light from the second light modulation element 12G transmits through the second PBS 9G and the cross dichroic prism 35, before then being projected onto the screen (not illustrated) via the projection lens 10.

The fourth color light (R light) enters a second light modulation element 12R for the R light via a second PBS 9R. The second light modulation element 12R modulates and reflects the fourth color light (P-polarized light) to provide image light. Image light from the second light modulation element 12R transmits through the second PBS 9R, and is then reflected by the cross dichroic prism 35 before then being projected onto the screen by the projection lens 10.

The first PBS 6 according to this embodiment is a wire grid polarization beam splitter (WG-PBS), but it may alternatively be a prism type PBS. The second PBS 9 according to this embodiment is a prism type PBS but may alternatively be a WG-PBS. In addition, the imaging optical system according to this embodiment includes the first lens system 7, the second lens system 8B for the B light, and the second lens system 8Y for the Y light.

The illumination optical system according to this embodiment includes the first fly-eye lens 3 and the second fly-eye lens 4, but it may alternatively use a rod integrator. In this embodiment, the first and second light modulation elements (11, 12B, 12G, 12R) are reflection type liquid crystal panels. But they may alternatively be transmission type liquid crystal panels or a micro mirror array.

The first and second light modulation elements may not be light modulation elements of the same type—for example, the first light modulation element may be a transmission type liquid crystal panel and the second light modulation element may be a reflection type liquid crystal panel.

Second Embodiment

Figure 4:
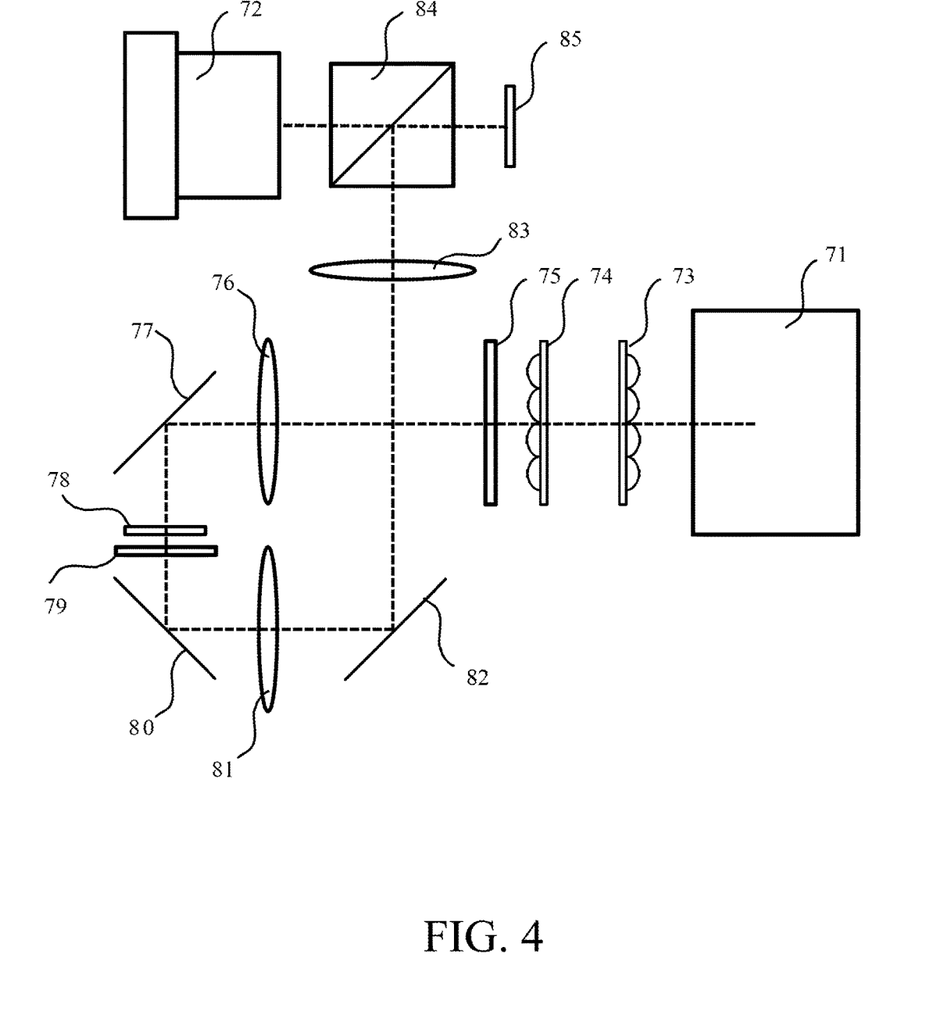
FIG. 4 is a sectional view illustrating a structure of an optical system in a projector according to a second embodiment of the present invention.

FIG. 4 illustrates a structure of an entire optical system in a projector according to a second embodiment of the present invention. Illumination light from a light source unit 71 enters a first fly-eye lens 73 and is divided into a plurality of light fluxes (plurality of light beams), and each light flux is condensed. The plurality of light fluxes pass a second fly-eye lens 74 and form a plurality of light source images, in a similar manner to the first embodiment. A polarization conversion element 75 is located near a position at which the light source image is formed.

The polarization conversion element 75 polarizes the plurality of light source fluxes from the second fly-eye lens 74 into polarized light (P-polarized light herein) having a specific polarization direction. The polarized light from the polarization conversion element 75 reaches and illuminates a first light modulation element 78 via a first PBS 76 and a first mirror 77. The first light modulation element 78 is driven based on the input image signal similar to the first embodiment so as to modulate the illumination light (from the polarization conversion element 75) and thereby generate luminance modulated light. Since this embodiment uses a transmission type liquid crystal panel for the first light modulation element 78, the luminance modulated light transmits through the first light modulation element 78.

The luminance modulated light (S-polarized light) emitted from the first light modulation element 78 transmits through an absorption type polarization plate 79, and is then reflected by a second mirror 80 into a second lens system 81. At this time, the P-polarized light that is not modulated by the first light modulation element 78 is absorbed by the absorption type polarization plate 79.

The luminance modulated light that passes through the second lens system 81 is reflected by a third mirror 82 into a third lens system 83. The light that passes through the third lens system 83 is reflected by a first polarization PBS 84 onto the second light modulation element 85.

The second light modulation element 85 is a reflection type liquid crystal panel and it is driven based on the above input image signal. The second light modulation element 85 modulates and reflects the luminance modulated light to provide image light. The image light (P-polarized light) emitted from the second light modulation element 85 transmits through the first PBS 84, and is projected on a projection surface (not shown) by a projection lens 72. The S-polarized light that is not modulated by the second light modulation element 85 is reflected by the first PBS 84 and returns to the light source unit side.

Even in this embodiment, the imaging optical system that includes the second lens system 81 and the third lens system 83 constitutes a telecentric optical system on both sides of the first light modulation element side and the second light modulation element side. The imaging magnification β of the imaging optical system satisfies the expression (1) or (2) above.

While FIG. 4 illustrates the single second light modulation element 85, the actual projector may include three second light modulation elements for separately modulating R (red), G (green), and B (blue) color light fluxes, as described in the first embodiment with reference to FIG. 3. In this case, the first PBS 84 can be used to separate incident light into different color light fluxes (e.g. R, G, and B light fluxes) and direct the different color light fluxes to the three second modulation elements. Conversely, the first PBS can also be used to combine together the different color image light fluxes (e.g. the R light, the G light, and the B light which have been modulated by their respective second modulation elements) from the second light modulation elements.

The first PBS 84 according to this embodiment is a prism type PBS but it may alternatively be a WG-PBS.

Third Embodiment

Figure 5:
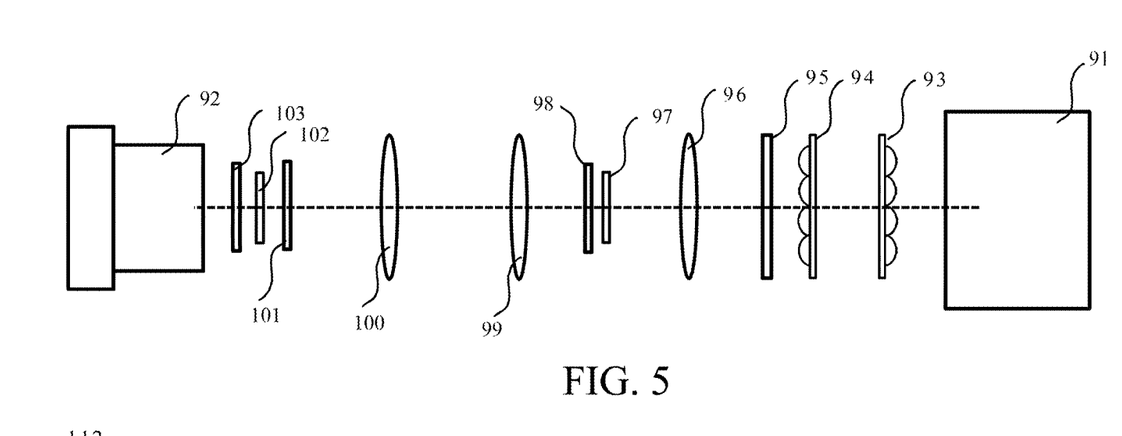
FIG. 5 is a sectional view illustrating a structure of an optical system in a projector according to a third embodiment of the present invention.

FIG. 5 illustrates a structure of an entire optical system in a projector according to a third embodiment of the present invention. Illumination light from a light source unit 91 enters a first fly-eye lens 93 and is divided into a plurality of light fluxes, and each light flux is condensed, as in the first embodiment. The plurality of light fluxes pass a second fly-eye lens 94, and form a plurality of light source images, as in the first embodiment. A polarization conversion element 95 is located near a position at which the light source image is formed.

A plurality of non-polarized light source fluxes incident on the polarization conversion element 95 are converted into polarized light (P-polarized light herein) with a specific polarization direction by the polarization conversion element 95. The polarized light from the polarization conversion element 95 then reaches and illuminates a first light modulation element 97 via a first lens system 96.

The first light modulation element 97 is a transmission type liquid crystal panel, and it is driven based on the input image signal similar to the first embodiment so as to modulate the illumination light according to the input image signal to provide luminance modulated light. The luminance modulated light (S-polarized light) emitted from the first light modulation element 97 transmits through (i.e. passes through) a first polarization plate (absorption type polarization plate) 98, and enters a second lens system 99. At this time, the P-polarized light that is not modulated by the first light modulation element 97 is absorbed by the first polarization plate 98.

The luminance modulated light condensed by the second lens system 99 is further condensed by a third lens system 100. The third lens system 100 directed the luminance modulated light onto a reflection type polarization plate 101 which transmits S-polarized light and reflects P-polarized light. Luminance modulated light transmitted through the polarization plate 101 then enters a second light modulation element 102. The second light modulation element 102 is a transmission type liquid crystal panel driven based on the above input image signal, and it modulates the luminance modulated light to generate and transmit image light.

The image light (P-polarized light) emitted from the second light modulation element 102 is transmitted through a second PBS 103, and is then projected on a projection surface, such as a screen (not shown), by a projection lens 92. The S-polarized light that is not modulated by the second light modulation element 102 is absorbed by the second PBS 103.

Even in this embodiment, the imaging optical system that includes the second lens system 99 and the third lens system 100 constitutes a telecentric optical system on both sides of the first light modulation element side and the second light modulation element side. The imaging magnification β of the imaging optical system satisfies the expression (1) or (2).

While FIG. 5 illustrates a single second light modulation element 102, it will be appreciated that, the actual projector may include three second light modulation elements for respectively modulating R (red), G (green), and B (blue) colors light fluxes, as described above (e.g. as described in the first embodiment with reference to FIG. 3). In this case, an unillustrated color separation and combination optical system directs the R light, G light, and B light as illumination light fluxes to these three second modulation elements, and combines together the R, G, and B image light fluxes generated by these three second light modulation elements.

Fourth Embodiment

Figure 6:
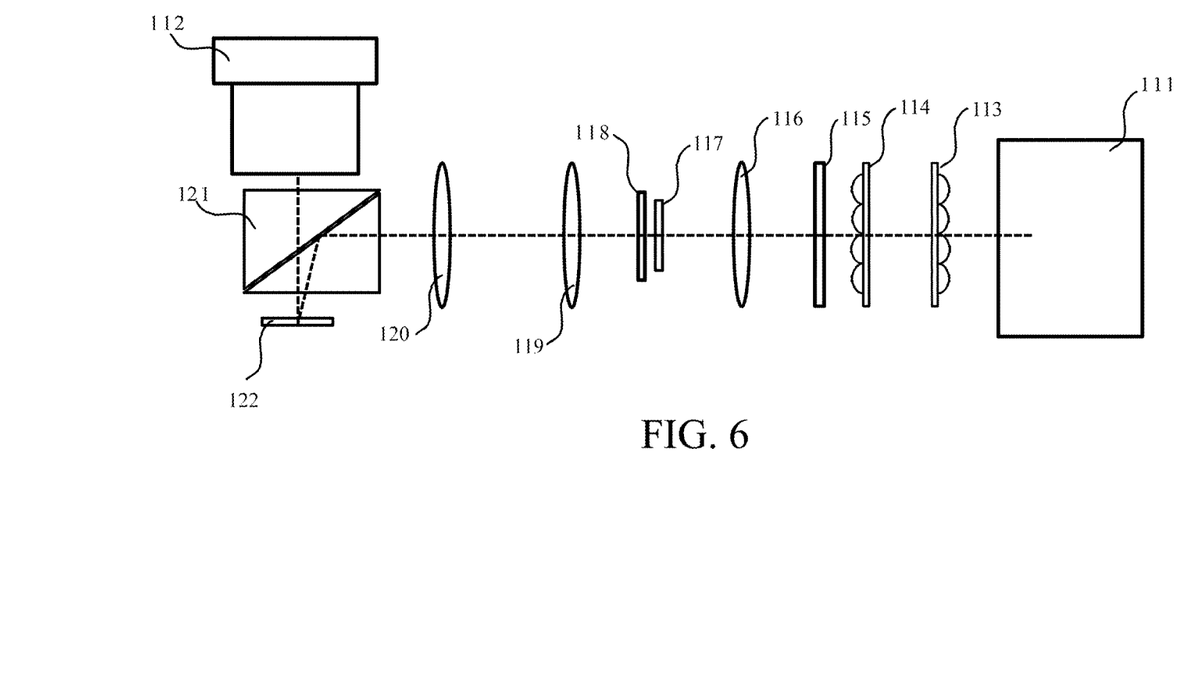
FIG. 6 is a sectional view illustrating a structure of an optical system in a projector according to a fourth embodiment of the present invention.

FIG. 6 illustrates a structure of an entire optical system in a projector according to a fourth embodiment of the present invention. This embodiment uses a micro mirror array as the second light modulation element.

Illumination light from a light source unit 111 enters a first fly-eye lens 113 and is divided into a plurality of light fluxes, and each light flux is condensed, as in the first embodiment. The plurality of light fluxes transmit a second fly-eye lens 114, and form a plurality of light source images, as in the first embodiment. A polarization conversion element 115 is located near a position at which the light source image is formed.

A plurality of non-polarized light source fluxes (from the second fly-eye lens 114) incident on the polarization conversion element 115 are converted into polarized light (P-polarized light herein) with a specific polarization direction by the polarization conversion element 115. The polarization light from the polarization conversion element 95 then reaches and illuminates a first light modulation element 117 via a first lens system 116. The first light modulation element 117 is a transmission type liquid crystal panel, and it is driven based on the input image signal similar to the first embodiment. The first light modulation element 117 modulates the incident illumination light to provide luminance modulated light.

The luminance modulated light (S-polarized light) emitted from the first light modulation element 117 is then transmitted through a first polarization plate (absorption type polarization plate) 118, before entering a second lens system 119. At this time, the P-polarized light that is not modulated by the first light modulation element 117 is absorbed by the first polarization plate 118.

The luminance modulated light condensed by the second lens system 119 is further condensed by a third lens system 120. The third lens systems 120 directs the luminance modulated light onto a TIR prism 121, where the luminance modulated light undergoes TIR (total internal reflection) before entering the second light modulation element 122. The second light modulation element 122 is a DMD, and it is driven based on the above input image signal. The second light modulation element 122 modulates and reflects the luminance modulated light from the TIR prism 121 to provide image light (ON light). The ON light from the second light modulation element 122 is then transmitted through the TIR prism 122 before being projected on an screen (not shown) by a projection lens 112. OFF light (black display light) from the second light modulation element 122 is reflected in a direction different from that of the ON light and does not enter the projection lens 112.

Even in this embodiment, the imaging optical system that includes the second lens system 119 and the third lens system 120 constitutes a telecentric optical system on both sides of the first light modulation element side and the second light modulation element side. The imaging magnification $\beta$ of the imaging optical system satisfies the expression (1) or (2).

In order to improve the light utilization efficiency of light incident on the second light modulation element 122, a quarter waveplate may optionally be located between the TIR prism 121 and the second light modulation element 122. The TIR prism has a good total reflection characteristic to the S-polarized light and a good transmittance characteristic to the P-polarized light. In this arrangement, the S-polarized light modulated by the first light modulation element 117 is totally internally reflected by the TIR prism 121, and then transmitted onto the quarter waveplate, where it is converted into circularly polarized light before then being reflected and modulated by the second light modulation element 122. Then, the ON light from the second light modulation element 122 transmits through the quarter waveplate, where it is converted into P-polarized light before being transmitted through the TIR prism 121, and into the projection lens 112.

Fifth Embodiment

Figure 7:
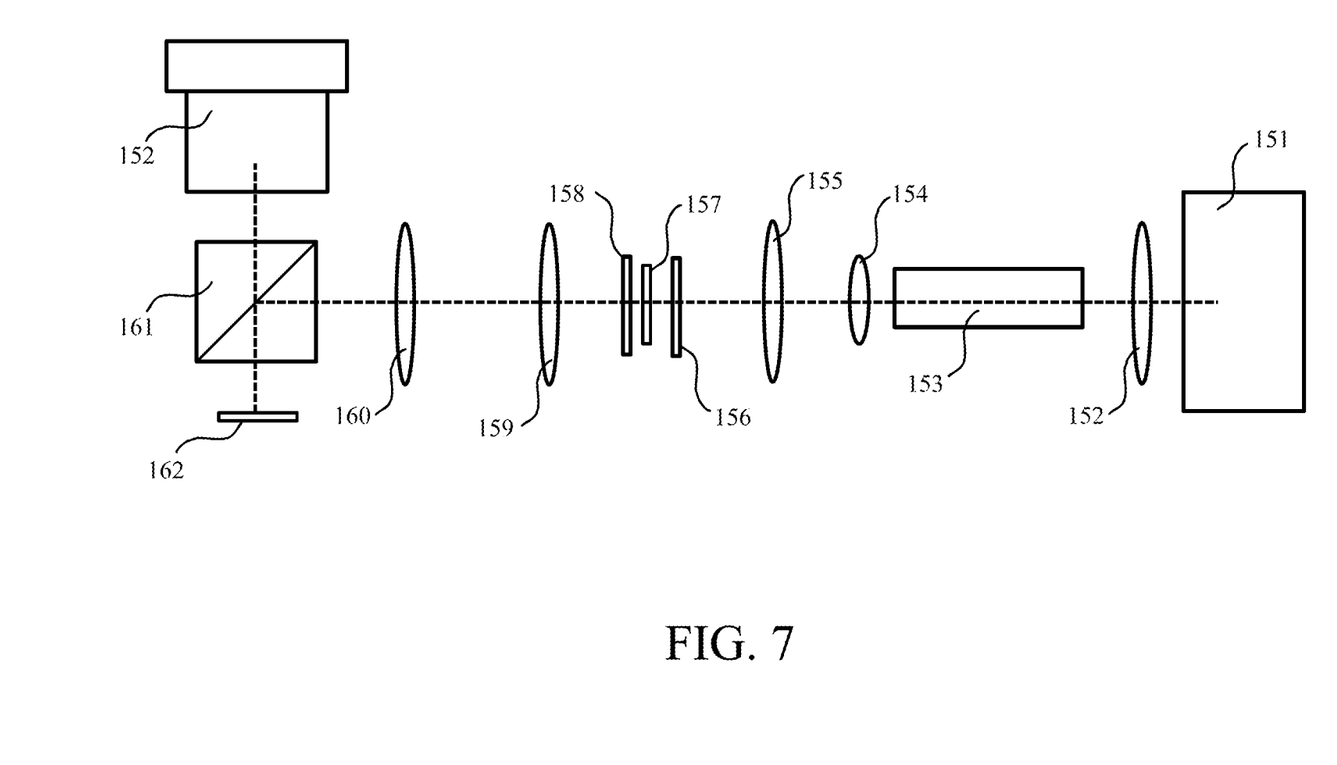
FIG. 7 is a sectional view illustrating a structure of an optical system in a projector according to a fifth embodiment of the present invention.

FIG. 7 illustrates a structure of an entire optical system in a projector according to a fifth embodiment of the present invention. A light source 151 is a polarization light source, such as a laser, that emits polarized light having a polarization direction aligned with a predetermined direction. The polarized light (P-polarized light) from the light source 151 is condensed by a condenser lens 152 and enters a rod integrator 153. Illumination light from the rod integrator 153 reaches and illuminates a first light modulation element 157 via a first lens system 154 and a second lens system 155 and a polarization plate 156 (which is arranged to transmit P-polarized light).

A relay lens that includes the first lens system 154 and the second lens system 155 is telecentric on both sides and makes the rod integrator 153 and the first light modulation element 157 conjugate with each other.

The first light modulation element 157 is a transmission type liquid crystal panel, and it is driven based on the above input image signal, as described in the first embodiment. The first light modulation element 157 modulates the incident illumination light to generate luminance modulated light.

The luminance modulated light (S-polarized light) emitted from the first light modulation element 157 is then transmitted through a first polarization plate (absorption type polarization plate) 158, before entering a third lens system 159. At this time, the P-polarized light that is not modulated by the first light modulation element 157 is absorbed by the first polarization plate 158.

The luminance modulated light condensed by the third lens system 159 is further condensed by a fourth lens system 160. Luminance modulated light from the fourth lens system 160 is then reflected by a PBS 161 before entering the second light modulation element 162. The second light modulation element 162 is a reflection type liquid crystal panel, and it modulates the luminance modulated light based on the above input image signal to generate reflected image light.

The image light (P-polarized light) emitted from the second light modulation element 162 transmits through the first PBS 161, and is then projected on a screen (not shown) by a projection lens 152. The S-polarized light that is not modulated by the second light modulation element 161 is reflected by the first PBS 161 and returned to the light source side.

Even in this embodiment, the imaging optical system that includes the third lens system 159 and the fourth lens system 160 constitutes a telecentric optical system on both sides of the first light modulation element side and the second light modulation element side. The imaging magnification $\beta$ of the imaging optical system satisfies the expression (1) or (2).

While FIG. 7 illustrates a single second light modulation element 162, the actual projector may include three second light modulation elements for separately modulating R (red), G (green), and B (blue) color light fluxes, as described in the first embodiment with reference to FIG. 3. In this case, the first PBS 161 may serve as part of a color separation and combination optical system that splits incident light into different color light fluxes (e.g. R, G, and Blight fluxes) for illuminating the three second modulation elements. The color separation and combination optical system may also combine together the R, G, and B image light fluxes that are generated by the second light modulation elements.

The first PBS 161 according to this embodiment is a prism type PBS but it may alternatively be a WG-PBS.

Sixth Embodiment

Figure 8:
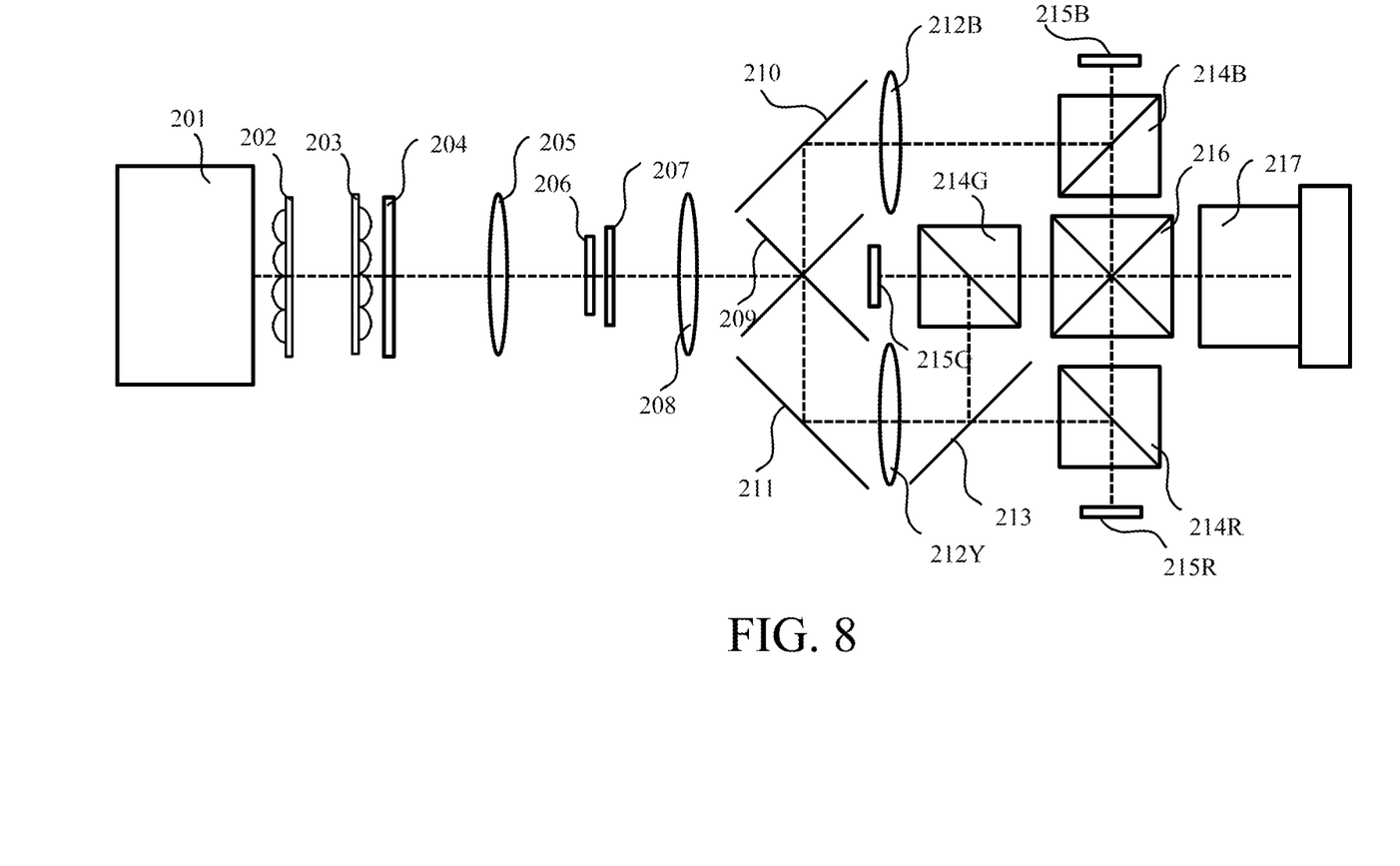
FIG. 8 is a sectional view illustrating a structure of an optical system in a projector according to a sixth embodiment of the present invention.

FIG. 8 illustrates a structure of an entire optical system in a projector according to a sixth embodiment of the present invention. Illumination light from a light source unit 201 enters a first fly-eye lens 202 and is divided into a plurality of light fluxes, and each light flux is condensed, as in the other embodiments. The plurality of light fluxes pass a second fly-eye lens 203, and form a plurality of light source images, as in other embodiments. A polarization conversion element 204 is located near a position at which the light source image is formed.

The plurality of non-polarized light source fluxes from the second fly-eye lens 203 are converted into polarized light (P-polarized light herein) having a specific polarization direction by the polarization conversion element 204. The polarized light from the polarization conversion element 204 then reaches and illuminates a first light modulation element 206 via a first lens system 205. The first light modulation element 206 is a transmission type liquid crystal panel, and is driven based on the input image signal similar to the first embodiment, and it modulates the illumination light to generate luminance modulated light.

The luminance modulated light (S-polarized light) emitted from the first light modulation element 206 is then transmitted through a first polarization plate (absorption type polarization plate) 208, before entering a second lens system 208. At this time, the P-polarized light that is not modulated by the first light modulation element 206 is absorbed by the first polarization plate 207.

The second lens system 208 condenses and directs the luminance modulated light onto a cross dichroic mirror (color separating element) 209. The cross dichroic mirror 209 separates the luminance modulated light into first color light (B light) and second color light (G light+R light).

The first color light is reflected on a first mirror 210 and enters a second light modulation element 215B (for modulating the B light) via a third lens system 212B and PBS 214B. Second light modulation element 215B is driven based on the input image signal and modulates and reflects the first color light to provide image light. The image light from the second light modulation element 215 B goes to a cross dichroic prism 216, where it is reflected into a projection lens 217. The projection lens 217 projects the incident light onto an unillustrated screen.

The second color light is transmitted to a third lens system 212Y specifically for the Y light. The third lens system 212Y directs the incident second color light to a dichroic mirror 213, which separates the light into third color light (G light) and fourth color light (R light) by reflecting the G light and transmitting R light. The third color light (G light) enters a second light modulation element 215G for modulating the G light via a PBS 214G. The third color light (P-polarized light) is then modulated by the second light modulation element 215G to provide image light. The image light from second modulation element 215 G is then transmitted through PBS 214G, cross dichroic prism 216, and into projection lens 217. The projection lens 217 projects incident light onto the screen.

The fourth color light enters a second light modulation element 215R for modulating the R light via a PBS 215R. Second light modulation element 215R modulates and reflects the incident fourth color light to provide image light. The image light from the second light modulation element 215R is then transmitted through PBS 214R, and reflected off cross dichroic prism 216 and into projection lens 217. Projection lens 217 projects the incident light onto the screen.

Even in this embodiment, the imaging optical system that includes the second lens system 208 and the third lens system 212 (R, Y) constitutes a telecentric optical system on both sides of the first light modulation element side and the second light modulation element side. The imaging magnification β of the imaging optical system satisfies the expression (1) or (2).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-154902, filed on Aug. 10, 2017, which is hereby incorporated by reference herein in its entirety.

What is claimed is:

1. An image projection apparatus comprising:
a first light modulation element configured to modulate first light from a light source and to generate second light, the first light modulation element having a first number of pixels that modulate the first light;
a second light modulation element configured to modulate the second light, the second light modulation element having a second number of pixels that modulate the second light, the second number of pixels of the second light modulation element that modulate the second light being greater in number than the first number of pixels of the first light modulation element that modulate the first light;
an imaging optical system configured to image the second light on the second light modulation element and disposed on an optical path from the first light modulation element to the second light modulation element,
wherein the image projection apparatus is configured to project an image formed by light from the second light modulation element onto a projection surface, and
wherein the imaging optical system satisfies $\beta \leq 0.95$ where $\beta$ is an imaging magnification of the imaging optical system.

2. The image projection apparatus according to claim 1, wherein an area of the first light modulation element over which the first light is incident is larger than an area of the second light modulation element over which the second light is incident.

3. The image projection apparatus according to claim 1, wherein an effective pixel area in the first light modulation element which modulates the first light into an irradiated light to the second light modulation element is smaller than a modulable pixel area configured to modulate light in the first light modulation element.

4. The image projection apparatus according to claim 1, wherein an effective pixel area in the first modulation element has a shape similar to an effective pixel area that modulates the second light in the second light modulation element.

5. The image projection apparatus according to claim 1, wherein the imaging optical system is a telecentric optical system on both sides of the first light modulation element and the second light modulation element.

6. The image projection apparatus according to claim 1, further comprising:
a color separation element configured to receive and separate the second light into a plurality of different color light fluxes; and
a polarization plate provided between the first light modulation element and the second light modulation element.

7. The image projection apparatus according to claim 6, wherein the polarization plate is an absorption type polarization plate.

8. The image projection apparatus according to claim 1, further comprising a polarization conversion element configured to receive and convert the first light into polarized light, and wherein the first light modulation element is a liquid crystal panel.

9. An image projection apparatus comprising:
a first light modulation element configured to modulate first light from a light source and to generate second light, the first light modulation element having a first number of pixels that modulate the first light;
a second light modulation element configured to modulate the second light, the second light modulation element having a second number of pixels that modulate the second light, the second number of pixels of the second light modulation element that modulate the second light being greater in number than the first number of pixels of the first light modulation element that modulate the first light;

an imaging optical system configured to image the second light on the second light modulation element and disposed on an optical path from the first light modulation element to the second light modulation element, wherein the image projection apparatus is configured to project an image formed by light from the second light modulation element onto a projection surface.

10. The image projection apparatus according to claim 9, wherein an area of the first light modulation element over which the first light is incident is larger than an area of the second light modulation element over which the second light is incident.

11. The image projection apparatus according to claim 9, wherein an effective pixel area in the first light modulation element which actually modulates the first light into an irradiated light to the second light modulation element is smaller than a modulable pixel area configured to modulate light in the first light modulation element.

12. The image projection apparatus according to claim 9, wherein an effective pixel area in the first modulation element has a shape similar to an effective pixel area that modulates the second light in the second light modulation element.

13. The image projection apparatus according to claim 9, wherein the imaging optical system is a telecentric optical system on both sides of the first light modulation element and the second light modulation element.

14. The image projection apparatus according to claim 9, further comprising:
 a color separation element configured to receive and separate the second light into a plurality of different color light fluxes; and
 a polarization plate provided between the first light modulation element and the second light modulation element.

* * * * *